United States Patent
Yamaguchi et al.

(10) Patent No.: US 9,837,811 B2
(45) Date of Patent: Dec. 5, 2017

(54) POWER SOURCE APPARATUS FORMED BY COMBINING A PLURALITY OF MODULES

(75) Inventors: Masao Yamaguchi, Sumoto (JP); Takanori Harada, Sumoto (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 131 days.

(21) Appl. No.: 13/816,987

(22) PCT Filed: Aug. 25, 2011

(86) PCT No.: PCT/JP2011/069205
§ 371 (c)(1),
(2), (4) Date: Feb. 14, 2013

(87) PCT Pub. No.: WO2012/026537
PCT Pub. Date: Mar. 1, 2012

(65) Prior Publication Data
US 2013/0141828 A1   Jun. 6, 2013

(30) Foreign Application Priority Data
Aug. 27, 2010 (JP) ................. 2010-190602

(51) Int. Cl.
*H02H 3/00* (2006.01)
*H02H 3/20* (2006.01)
(Continued)

(52) U.S. Cl.
CPC ........... *H02H 3/207* (2013.01); *H01M 10/44* (2013.01); *H01M 10/48* (2013.01); *H02H 7/18* (2013.01); *H02J 7/0031* (2013.01); *H02J 7/0013* (2013.01)

(58) Field of Classification Search
CPC ......... H02H 7/18; H02J 7/0031; H03H 3/207; H01M 10/44; H01M 10/48
(Continued)

(56) References Cited

U.S. PATENT DOCUMENTS 6,492,791 B1 * 12/2002 Saeki et al. ................ 320/135
2006/0076923 A1 * 4/2006 Eaves .................. G01T 1/2018
320/112
(Continued)

FOREIGN PATENT DOCUMENTS

JP   2005-143160   6/2005
JP   2006-149068   6/2006
(Continued)

OTHER PUBLICATIONS

International Search Report dated Nov. 8, 2011 in International Application No. PCT/JP2011/069205.

*Primary Examiner* — Thienvu Tran
*Assistant Examiner* — Lucy Thomas
(74) *Attorney, Agent, or Firm* — Wenderoth, Lind & Ponack, L.L.P.

(57) ABSTRACT

The power source apparatus enables each battery pack to be charged with power supplied from an external charging power supply, and allows power stored in each battery pack to be output externally. Each battery pack is provided with battery pack fault output terminals to send battery pack error signals to other battery packs or to the protection unit when a malfunction occurs. The protection unit is provided with protection unit input-output terminals to connect with battery pack fault output terminals, and a protection circuit capable of cutting-off battery pack current. When a battery pack malfunction occurs, a battery pack error signal is output from the battery pack fault output terminals to the protection unit input-output terminals. When the protection unit detects a battery pack error signal, the protection circuit cuts-off current.

10 Claims, 6 Drawing Sheets

(51) Int. Cl.
*H01M 10/44* (2006.01)
*H01M 10/48* (2006.01)
*H02H 7/18* (2006.01)
*H02J 7/00* (2006.01)

(58) Field of Classification Search
USPC .................................................. 361/84, 86
See application file for complete search history.

(56) References Cited

U.S. PATENT DOCUMENTS

| | | |
|---|---|---|
| 2006/0103351 A1 | 5/2006 | Tanigawa et al. |
| 2007/0188148 A1* | 8/2007 | Kawasumi et al. ........... 320/134 |
| 2009/0160395 A1* | 6/2009 | Chen .......................... H02J 7/35 |
| | | 320/101 |
| 2009/0184682 A1* | 7/2009 | Kosugi et al. ................ 320/134 |
| 2010/0072950 A1 | 3/2010 | Tatebayashi et al. |
| 2011/0199115 A1 | 8/2011 | Iida |

FOREIGN PATENT DOCUMENTS

| | | |
|---|---|---|
| JP | 2008-235032 | 10/2008 |
| JP | 2010-81721 | 4/2010 |
| JP | 2010-104175 | 5/2010 |

\* cited by examiner

POWER SOURCE APPARATUS FORMED BY COMBINING A PLURALITY OF MODULES

BACKGROUND OF THE INVENTION

1. Field of the Invention

The present invention relates primarily to a power source apparatus provided with a high capacity array of batteries to output both high voltage and high current.

2. Description of the Related Art

A power source apparatus with both high output voltage and high output current has many batteries connected in series to increase the output voltage. By combining many battery cells in modular form, solutions that are flexible with respect to different voltages and currents become possible. Battery cells can be formed into units or modularized to form battery packs. Power source apparatus that can connect a plurality of battery packs in parallel have previously been developed by the present applicant and others (refer to Japanese Laid-Open Patent Publication 2006-149068).

These types of power source apparatus contain protection circuitry to protect the battery cells from conditions such as over-charging and over-discharging. Protection circuitry protects the battery cells by action such as opening a circuit breaker when an abnormal condition is determined. For example, an abnormal condition can be battery pack charging or discharging current in excess of a threshold value, or detection of voltage in a battery cell, which makes up a battery pack, above an upper limit threshold or below a lower limit threshold.

However, when a plurality of these modularized battery packs are put together to form a power source apparatus, each module houses protection circuitry. As a result, protection circuitry is duplicated, and that duplication is wasteful from the perspective of cost and space. Further, since the protection circuitry in each module operates independently, response to an abnormal condition can result in interference or contradiction when many modules are used in combination. Contending with these different judgment results generated by many modules for a given abnormality is problematic.

The present invention was developed considering these types of prior art problems. Thus, it is a primary object of the present invention to provide a power source apparatus that is formed by combing a plurality of modules and has battery protection circuitry capable of operating with a high level of reliability.

SUMMARY OF THE INVENTION

To achieve the object described above, the power source apparatus for the first aspect of the present invention is provided with one or more battery packs 20 having a plurality of rechargeable battery cells 31 connected in series and/or parallel, and a protection unit 2 that can electrically connect with the battery packs 20. Each battery pack 20 can be charged with power supplied from an external charging power supply CP, and power stored in each battery pack 20 can be output to the outside. Each battery pack 20 is provided with battery pack fault output terminals DA, DO, DI to send battery pack error signals to other battery packs 20 or to the protection unit 2 when an abnormal condition develops. The protection unit 2 is provided with protection unit input-output terminals HI that connect with battery pack fault output terminals DA, DO, DI, and a protection circuit capable of cutting-off battery pack 20 current. When a battery pack 20 abnormality occurs, a battery pack error signal is output from the battery pack fault output terminals DA, DO, DI of the affected battery pack 20 to the protection unit input-output terminals HI of the protection unit 2. When the protection unit 2 detects a battery pack error signal, the protection circuit cuts-off current. This configuration affords protection of a plurality of battery packs via the protection circuit housed in a single protection unit, and allows overall structure simplification by eliminating the need to provide a protection circuit in each battery pack. Further, since the protection unit can unify and centrally manage circuit protection without having a plurality of protection circuits operating in parallel, interference and operating errors can be avoided. This can provide battery protection that is simple from a control standpoint to reduce operating errors, and is superior with respect to safety and reliability.

In the power source apparatus for the second aspect of the present invention, the battery packs 20 and protection unit 2 can be connected via a common output line OL, and the protection circuit can be connected in series with the output line OL. This allows current output from a battery pack to be stopped by the protection circuit.

In the power source apparatus for the third aspect of the present invention, a battery pack 20 can be provided with battery blocks 30 made up of a plurality of battery cells 31 connected in parallel, a battery monitoring circuit 33 connected in parallel with each battery block 30 to detect the voltage of each battery cell 31, a battery pack control circuit 39 connected to the battery monitoring circuit 33 to control battery block 30 output current, and a current fuse 32 connected in series with the battery blocks 30 to cut-off current flow when it exceeds a given value. If the battery monitoring circuit 33 detects a voltage greater than or equal to a given battery cell threshold voltage in any of the battery cells 31, the battery pack control circuit 39 can issue a battery pack error signal from the battery pack fault output terminals DA, DO, DI.

In the power source apparatus for the fourth aspect of the present invention, a battery pack 20 is further provided with a second battery monitoring circuit 33B. The system can be configured to cut-off current at a first battery cell threshold voltage detected by the battery monitoring circuit 33, and to cut-off current at a second battery cell threshold voltage that is higher than the first battery cell threshold voltage and detected by the second battery monitoring circuit 33B. This allows a plurality of threshold values to be set inside a battery pack to establish two levels of protection.

The power source apparatus for the fifth aspect of the present invention can have a plurality of battery packs 20 connected in parallel, and the protection unit 2 can be connected in parallel with the battery packs 20.

In the power source apparatus for the sixth aspect of the present invention, the protection circuit can be provided with a charging cut-off switch CSSW that cuts-off charging current, and a discharge cut-off switch DSSW that cuts-off discharge current.

In the power source apparatus for the seventh aspect of the present invention, the protection unit 2 can be provided with battery charging functional capability to charge battery packs 20 with power supplied from an external charging power supply CP. This makes it unnecessary to provide battery charging functional capability in each battery pack, and has the positive feature of concentrating battery charging operations in the protection unit.

In the power source apparatus for the eighth aspect of the present invention, battery packs 20 do not have to have battery charging functional capability. This allows battery charging functional capability to be omitted from each battery pack, and has the positive feature of simplifying the overall system structure.

In the power source apparatus for the ninth aspect of the present invention, the charging power supply CP can be solar cell panels. This allows construction of a power source apparatus that can charge rechargeable battery cells with energy generated by solar cell panels.

In the power source apparatus for the tenth aspect of the present invention, communication between battery packs 20 can be conducted according to recommended standards (RS)-485.

DESCRIPTION OF EMBODIMENT(S)

The following describes embodiments of the present invention based on the figures. However, the following embodiments are merely specific examples of a power source apparatus representative of the technology associated with the present invention, and the power source apparatus of the present invention is not limited to the embodiments described below. In particular, to make the claims easily understood, components of the embodiments are named and labeled in the [Scope of the Claims] and [Method of Resolution and Effectiveness of the Invention] sections. However, components cited in the claims are in no way limited to the components indicated in the embodiments. In particular, in the absence of specific annotation, structural component features described in the embodiment such as dimensions, raw material, shape, and relative position are simply for the purpose of explicative example and are in no way intended to limit the scope of the invention. Properties such as the size and spatial relation of components shown in the figures may be exaggerated for the purpose of clear explanation. In the descriptions following, components with the same name and label indicate components that are the same or have the same properties and their detailed description is appropriately abbreviated. Further, a single component can serve multiple functions and a plurality of structural elements of the invention can be implemented with the same component. In contrast, the functions of a single component can be divided among a plurality of components. In addition, explanations used to describe part of one embodiment may be used in other embodiments and descriptions.

First Embodiment

Figure 1:
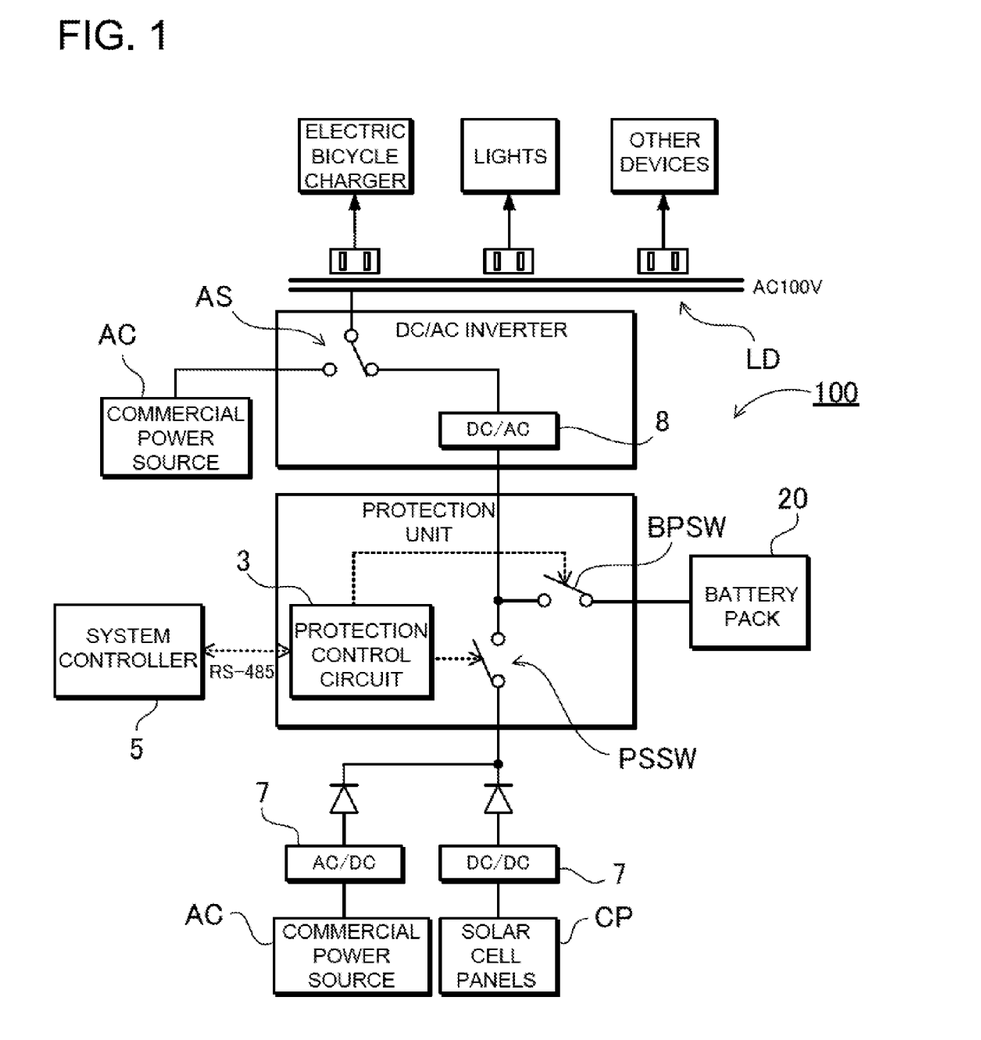
FIG. 1 is a block diagram showing a power source system using the power source apparatus of the first embodiment.
Figure 2:
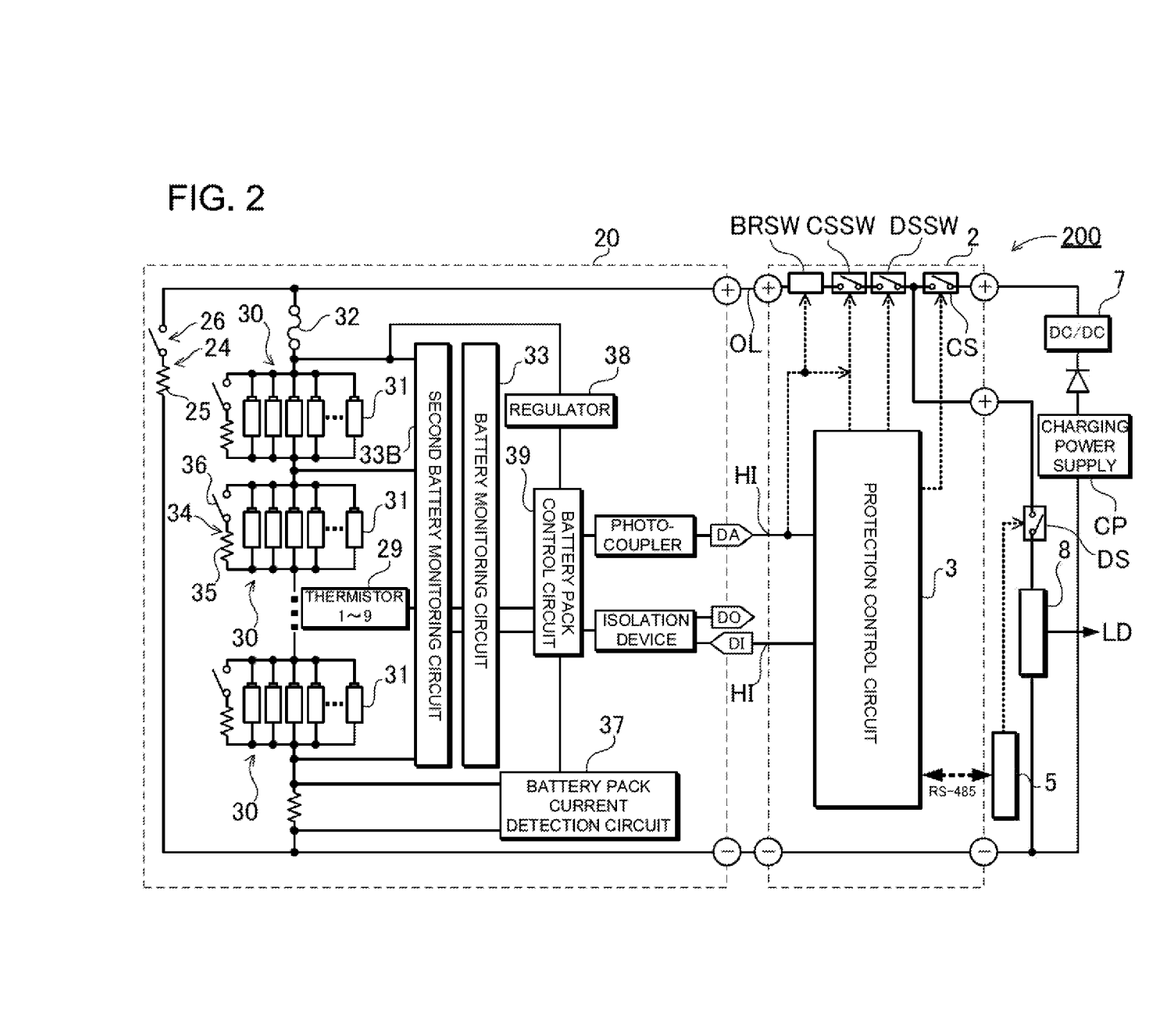
FIG. 2 is a block diagram showing the battery pack in FIG. 1.

Turning to FIGS. 1 and 2, a power source apparatus 100 for the first embodiment of the present invention is shown. FIG. 1 shows a block diagram of a power source system using the power source apparatus 100, and FIG. 2 shows a block diagram of the battery pack 20 in FIG. 1. The power source system is provided with a power source apparatus 100, a load LD, a charging power supply CP, and a system controller 5. The power source apparatus 100 is charged by the charging power supply CP and subsequently drives the load LD. Accordingly, the power source apparatus 100 has a charging mode, a discharging mode, and an equalizing mode (described later) to equalize battery units. The system controller 5 conducts data communication with the power source apparatus 100 and supervises overall operation.

The power source apparatus 100 is made up of one or more battery packs 20 and a protection unit 2. The protection unit 2 is provided with a battery pack connecting switch BPSW that connects and disconnects battery packs 20, a power supply connecting switch PSSW that connects and disconnects the charging power supply CP, and a protection control circuit 3 that switches the battery pack connecting switch BPSW and power supply connecting switch PSSW ON and OFF and is electrically connected with an output power converter 8. Semiconductor switching devices such as field effect transistors (FETs) or insulated gate bipolar transistors (IGBTs) can be used as the battery pack connecting switch BPSW and power supply connecting switch PSSW.

Figure 3:
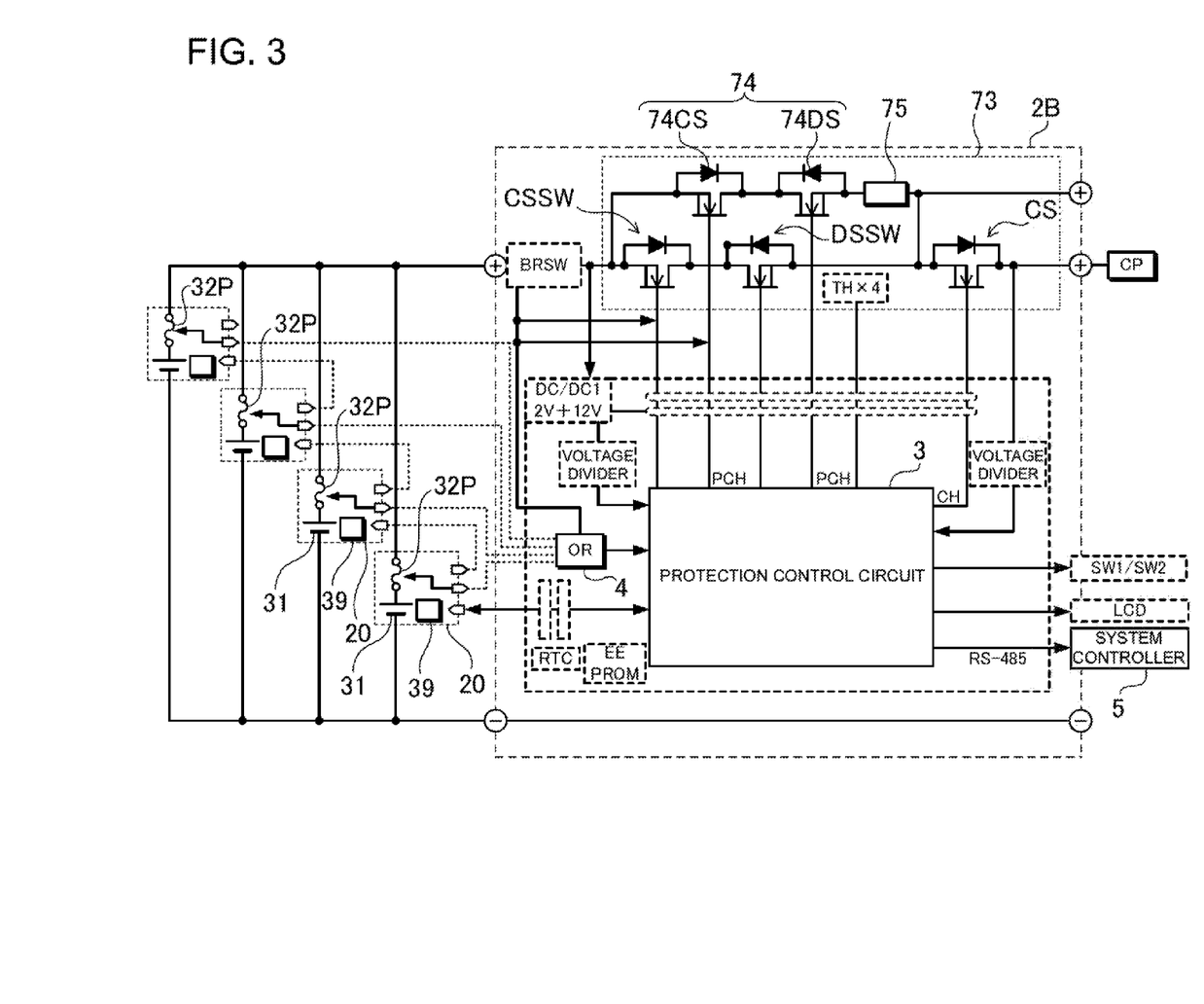
FIG. 3 is a block diagram showing a protection unit provided with auxiliary charging circuitry in an alternative example.
Figure 6:
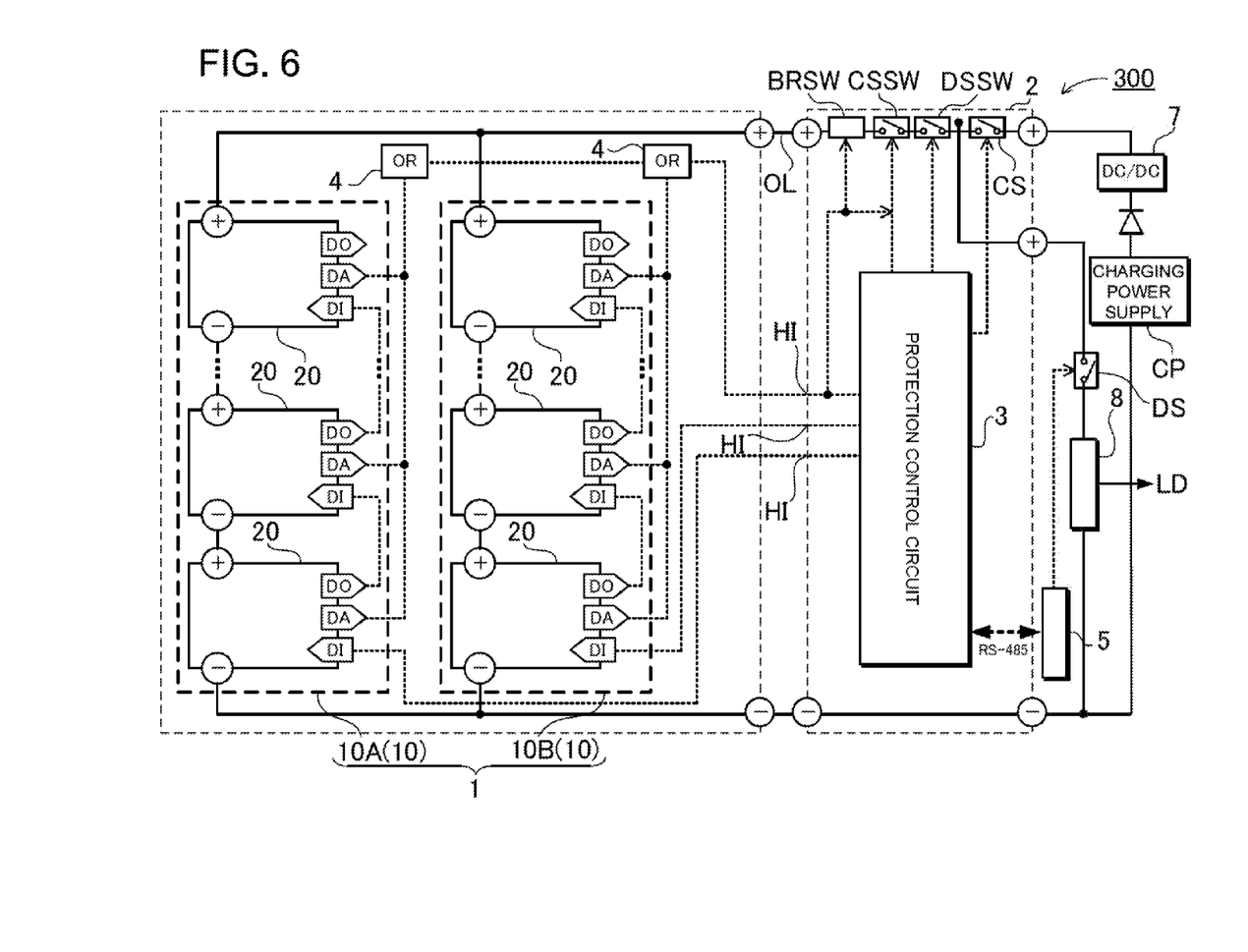
FIG. 6 is a block diagram showing an example of a power source apparatus constructed using of a plurality of battery packs.

Although FIG. 2 shows only one battery pack 20, it should be clear that a series and/or parallel connection of a plurality of battery packs 20 can be connected to the protection unit 2 (refer to FIGS. 3 and 6).

In the charging mode, by switching ON the battery pack connecting switch BPSW shown in FIG. 1 (equivalent to switches CSSW and DSSW in FIG. 2) and the power supply connecting switch PSSW (equivalent to switch CS in FIG. 2), the battery pack 20 is charged from the charging power supply CP. Alternatively, in the discharging mode, the power supply connecting switch PSSW is turned OFF to disconnect the charging power supply CP (or the power supply connecting switch PSSW is left ON), and battery pack 20 power is supplied to the load LD. The protection unit 2 protection control circuit 3 switches appropriately between the charging mode and discharging mode via data communication or input-output (I/O) port connection with the load-side output power converter 8. Specifically, when battery pack 20 remaining capacity becomes less than or equal to a lower threshold limit, the charging mode is suspended and the system switches to the discharging mode.

Although not illustrated in FIG. 1, the load LD and charging power supply CP are connected to the power source apparatus 100 via a discharge switch and a charging switch respectively. The discharge switch and charging switch are switched ON and OFF by the protection control circuit 3 in the protection unit 2. Further, depending on requirements, the system can also be configured to simultaneously supply power to the load LD while charging the power source apparatus 100.

(Load LD)

The load LD driven by the power source apparatus 100 is connected to the power source apparatus 100 through the output power converter 8. The output power converter 8 is a direct current-to-alternating current (DC/AC) converter that converts DC power supplied from the battery pack 20 to AC power. Naturally, when a load that can operate on DC power is connected, a DC/DC converter can be used instead of the DC/AC converter.

Depending on circumstances, an external source of commercial power AC can also be connected to the load LD to allow switch-over to commercial power in case of insufficient battery pack 20 power. In the example of FIG. 1, a commercial power selection switch AS is provided. Here, decay in battery pack 20 power is detected, and for example, the protection control circuit 3 switches the commercial power selection switch AS from the battery pack 20 to the commercial power source. A source of AC power such as 100V, 200V, (120V) etc. can be used as the commercial power source.

(Charging Power Supply CP)

The charging power supply CP connects to the battery pack 20 through the protection unit 2 power supply connecting switch PSSW (equivalent to switch CS in FIG. 2). The battery pack 20 is charged by the charging power supply CP when the protection control circuit 3 switches ON the power supply connecting switch PSSW. When battery pack 20 full-charge is detected, the protection control circuit 3 turns OFF the power supply connecting switch PSSW. Renewable energy power generating systems such as solar cell panels, wind power generating systems, tidal power generating systems, and geothermal power generating systems; or power generating systems such as fuel cells and gas turbine power generating systems can be used as the charging power supply CP. In the example of FIG. 1, solar cell panels are used for power generation. In addition to this type of power generation, a commercial power source AC can also be added as a backup. This arrangement allows the battery pack 20 to be charged using the commercial power source when power obtained from the generating system is insufficient or during emergencies.

In addition, an input power converter 7 is provided between the charging power supply CP and the power source apparatus 100 to convert the supplied power to a voltage and current appropriate for charging the battery pack 20. In the example of FIG. 1, a DC/DC converter is connected between the solar cell panels, which generate the charging power, and the power source apparatus 100. Further, an AC/DC converter is connected between the commercial power source AC and the power source apparatus 100 to convert 100 V AC to DC power. The battery pack 20 can be charged with appropriate power via the input power converters 7. It should also be clear that pulse-charging using switching devices can be used to reduce power conversion losses associated with the input power converters 7.

(Battery Pack 20 Block Diagram)

Battery pack 20 details are described based on the block diagram in FIG. 2. As shown in this figure, the battery pack 20 is provided with a battery assembly having a plurality of battery cells 31 connected in series and parallel, a current fuse 32 connected in series with the battery assembly, a battery monitoring circuit 33, a battery pack current detection circuit 37, and a battery pack control circuit 39. The battery pack control circuit 39 is made up of a microcomputer (or application-specific integrated circuit [ASIC] or programmable gate array [PGA]). Power is supplied to operate the battery pack control circuit 39 by converting power from the battery assembly via a regulator 38. Further, as shown in FIG. 3, a self control protector (SCP; Dexerials Corporation [Sony Group] product name) 32P can also be added to a battery pack 20. The SCP 32P fuses open by passing current through an internal resistor that heats a fuse when a battery pack error signal is issued from a second battery monitoring circuit 33B (described later). When an SCP 32P is used, its voltage rating should be considered and the number of series-connected battery packs 20 limited as shown in FIG. 3.

The battery pack 20 is housed in a battery pack case. A standard 19-inch rack-mount case such as that used in server computer back-up power supplies can be used as the battery pack case. This can improve versatility by utilizing a commonly available chassis such as a server rack.

The current fuse 32 physically opens the circuit in an over-current situation to protect the battery pack 20. The battery monitoring circuit 33 detects battery block 30 voltage and sends that data to the battery pack control circuit 39. In the charging mode, the battery pack control circuit 39 detects battery pack 20 over-charging and protects the battery cells 31 from over-charging by limiting the charging current. Similarly, in the discharging mode, the battery pack control circuit 39 detects battery pack 20 over-discharging and protects the battery cells 31 from over-discharging by limiting the discharge current.

(Battery Pack Control Circuit 39)

Also in the example of FIG. 2, a battery pack input terminal DI and a battery pack output terminal DO are connected to the battery pack control circuit 39 via isolation devices. In addition, a battery pack error output terminal DA is connected to the battery pack control circuit 39 via a device such as a photo-coupler (optical isolation device). This isolates each signal terminal with respect to external connection. Signal terminal details are described later.

(Battery Pack Current Detection Circuit 37)

The battery pack current detection circuit 37 detects charging and discharging current and sends that data to the battery pack control circuit 39. For example, the battery pack current detection circuit 37 can detect battery pack current from the voltage across a current detection resistor connected in series with the battery pack 20.

(Battery Monitoring Circuit 33)

Temperature sensors 29 that detect battery cell 31 temperature and voltage sensors that detect battery block 30 voltage are connected to the battery monitoring circuit 33. Devices such as thermistors can be used as the temperature sensors 29. The battery monitoring circuit 33 detects battery block 30 over-charging or over-discharging based on battery cell 31 temperature and battery cell 31 or battery block 30 voltage. If an abnormal condition is detected, the battery pack control circuit 39 issues a battery pack error signal from the battery pack error output terminal DA. The protection control circuit 3 receives that error signal and opens a charging cut-off switch CSSW or discharge cut-off switch DSSW (described later) to cut-off battery pack 20 charging and discharging current. A protection integrated circuit (IC) can be used as the battery monitoring circuit 33.

(Second Battery Monitoring Circuit 33B)

The battery pack 20 in FIG. 2 is also provided with a second battery monitoring circuit 33B in addition to the battery monitoring circuit 33. In this example, the battery monitoring circuit 33 cuts-off current at a first battery cell threshold voltage (for example, 4.15V/cell). Meanwhile, the second battery monitoring circuit 33B cuts-off current at a second battery cell threshold voltage (for example, 4.3V/cell) that is higher than the first battery cell threshold voltage. In addition, the second battery monitoring circuit 33B is configured to directly output a battery pack error signal from the battery pack error output terminal DA through the photo-coupler without battery pack control circuit 39 intervention. Further, when the protection unit 2 receives this type of battery pack error signal, a breaker switch BRSW and/or the charging cut-off switch CSSW are switched to the cut-off state without intervention of the protection control circuit 3. By establishing this type of redundant protection, battery cells can be protected even when battery pack control circuit 39 error detection is not functioning properly. This adds another level of safety. Note that the second battery monitoring circuit 33B can also be implemented by a protection IC.

In any error condition resulting in battery pack cut-off in a system with a plurality of connected battery packs (as described later), cut-off switches can be disposed to only disconnect the malfunctioning battery pack or battery unit that includes the affected battery pack from the power source apparatus.

(Battery Block 30)

Each battery pack 20 has a plurality of battery blocks 30 connected in series, and each battery block 30 has a plurality of battery cells 31 connected in parallel. It is also possible for a battery pack to have only parallel-connected battery cells and no series-connected battery cells. In this example, the battery pack 20 is made up of a battery assembly having thirteen battery blocks 30 connected in series, and each battery block 30 has twenty four battery cells 31 connected in parallel. Therefore, a total of 312 battery cells 31 are used in the battery pack 20. This battery pack 20 is used with a specified voltage of 50 V and a specified current of 30A. As described later, one battery unit 10 shown in FIG. 6 is made up of five of these battery packs 20 connected in series (in the figure, each battery unit is shown as a column of three battery packs with two battery packs not shown). Therefore, each battery unit 10 uses a total of 1560 battery cells 31 to achieve a specified voltage of 250 V and a specified current of 30A. Further, by connecting a plurality of these battery units in parallel, a high reliability power source apparatus 100 is formed. The capacity of the array of batteries is set by the total number of batteries depending on the application. For example, capacity can be 1 KVA to 100 KVA.

(Battery Cell 31)

Besides circular cylindrical battery cells that are elongated in one direction, battery cells that have rectangular outer cases can be used as battery cells 31. Rechargeable batteries such as lithium ion rechargeable batteries, nickel hydride batteries, and nickel cadmium batteries are appropriate for use as battery cells 31. In particular, the use of lithium ion rechargeable batteries is desirable. Since lithium ion rechargeable batteries have high energy density (charge capacity density), they are appropriate for compactness and weight reduction. Further, compared with nickel hydride batteries and lead storage batteries, lithium ion rechargeable batteries can be charged and discharged over a wider temperature range allowing efficient charging and discharging. Battery cells 31 are preferably a standardized size such as 18650 (18 mm diameter and 65 mm length circular cylindrical battery) or 17670. In addition, commonly marketed batteries such as AA or AAA batteries can also be used. Although the present example uses circular cylindrical batteries, it should be apparent that rectangular batteries can also be used.

Use of iron phosphate-system materials is desirable for the battery cell 31 positive electrode. This allows the margin of safety to be increased and charging and discharging temperature dependence to be suppressed. In particular, since relatively high charging and discharging efficiency can be maintained even at low temperatures, efficient charging and discharging is possible even in winter.

Further, the positive electrode of a lithium ion rechargeable battery can be a three-component electrode. This type of lithium ion rechargeable battery uses a mixture of Li—Ni—Mn—Co compound oxides and lithium cobalt oxide instead of just lithium cobalt oxide used in prior art. By using the three components Ni—Mn—Co in addition to lithium in the positive electrode of this type of lithium ion rechargeable battery, high voltage charging can be performed with good thermal stability, and the maximum charging voltage can be increased to 4.3 V to increase charge capacity.

However, it is desirable to intentionally set the battery cell 31 charging voltage lower than the voltage for determining full-charge. For example, in the case of a lithium ion rechargeable battery, although full-charge is determined around 4.2 V under normal conditions, the voltage for judging full-charge is set to 4V. This contributes to lengthening battery cell lifetime.

Further, assume the specified voltage of the battery pack, which is made up of battery cells 31 (for lithium ion battery cells, the specified voltage is approximately 3.7 V to 4.0 V per cell times the number of series-connections), is taken to be the nominal voltage. It is desirable to choose the nominal voltage (specified voltage) below the maximum output operating voltage Vop of the solar cell panels, which are the charging power supply CP. More preferably, the specified voltage is selected to be 70% to 90% of Vop. This is because there are inter-related effects between the solar panel operating voltage and battery pack voltage that make charging power drop-off for a battery pack voltage that is far from Vop. Further, this makes the voltage of the solar cell panels high compared to battery pack depth of discharge. Accordingly, when charging to full-charge, it is preferable for the voltage near the full-charge state to approach Vop. It is also necessary to select an appropriate battery pack voltage considering solar panel voltage variation with temperature. Therefore, a battery pack voltage in the range mentioned above is preferable.

(Protection Unit 2)

The protection unit 2 is also described based on FIG. 2. The protection unit 2 is provided with protection unit input-output terminals HI that connect with battery pack fault output terminals DA, DO, DI, a protection circuit that can cut-off battery pack 20 current, and a charging switch CS. The charging switch CS is operated in the charging mode when the battery pack 20 is charged by the charging power supply CP. The charging switch CS is controlled OFF when the battery pack 20 reaches full-charge. Switches are controlled ON and OFF by the protection unit 2 protection control circuit 3. As shown in FIG. 2, the charging switch CS is connected in series and is normally ON in the charging mode. The charging switch CS is implemented with a semiconductor switching device such as a FET. In this manner, by establishing battery pack charging capability and discharging capability within the protection unit rather than in the battery pack, battery pack structure can be simplified. In particular, in a configuration having a plurality of connected battery packs, this structural simplification becomes more advantageous as the number of battery packs increases. The discharge switch, which is operated in the discharging mode when driving the load LD with the battery pack 20, is disposed at the load LD. A charging FET and a discharging FET in the protection circuit are switched OFF only during a fault condition and are maintained ON when there is no malfunction.

(Protection Circuit)

When a battery pack 20 abnormality develops, a battery pack error signal is output from the battery pack 20 fault output terminals DA, DI to the protection unit 2 input-output terminals HI. The protection circuit includes switches that cut-off current when the protection control circuit 3 detects a battery pack error signal. In the present example, a charging cut-off switch CSSW, which is opened for an abnormality during charging mode operation, and a discharge cut-off switch DSSW, which is opened for an abnormality during discharging mode operation, are connected in series. During operation in either mode, when a battery pack error signal is input to the protection unit input-output terminals HI, the appropriate cut-off switch is opened. The charging cut-off switch CSSW and discharge cut-off switch DSSW are implemented by semiconductor switching devices such as FETs.

The protection circuit can also be provided with a breaker switch BRSW disposed in the current path to add another level of safety. The breaker switch BRSW is configured to open when an error signal is input. A device such as a Nippon Thermo Co. LTD. circuit protector STP20 (series model name) can be used as the breaker switch BRSW.

The second battery monitoring circuit 33B is configured to directly output battery pack error signals from the battery pack error output terminal DA through the photo-coupler without intervention of the battery pack control circuit 39. In the protection unit 2, this type of battery pack error signal activates switching of the breaker switch BRSW and/or the charging cut-off switch CSSW to the cut-off state without intervention of the protection control circuit 3.

(Auxiliary Charging Circuit 73)

An auxiliary charging circuit can also be provided for the protection circuit in the protection unit. An example of this type is shown in FIG. 3. As shown in this figure, the protection unit 2B is provided with an auxiliary charging circuit 73 and components such as semiconductor switching devices. When a battery cell 31 is maintained in a state with a voltage at or below the over-discharging voltage, instead of performing normal charging, the auxiliary charging circuit 73 performs auxiliary charging at a reduced current level. The auxiliary charging circuit 73 is provided with a resistor 75 to reduce the charging current, and an auxiliary charging switch 74 controlled by ON and OFF signals issued according to protection control circuit 3 commands from a port PCH. A semiconductor switching device such as a FET can be suitably used as the auxiliary charging switch 74. In the example of FIG. 3, two series-connected FETs implement the auxiliary charging switch 74. At the start of charging in a condition such as battery voltage at or below the over-discharging voltage, the protection control circuit 3 issues an OFF signal to the charging cut-off switch CSSW and issues an ON signal from the port PCH to the auxiliary charging switch 74, which is a charging cut-off FET 74CS. As a result of this switching, when charging current is supplied from the charging power supply CP, battery cells 31 are charged by a reduced current that flows through the resistor 75 and the auxiliary charging switch 74 in the ON state. Subsequently, if battery voltage becomes greater than or equal to a specified voltage (for example, 3.0V/cell) within a specified time period from the start of charging (for example, 90 min), the protection control circuit 3 turns OFF the auxiliary charging switch 74 and turns ON the charging cut-off switch CSSW (as well as the charging switch CS) to perform normal charging. If battery voltage remains below the specified voltage (for example, 3.0V/cell) even after the specified time period from the start of charging (for example, 90 min), battery cell 31 degradation that precludes normal charging is judged and an error signal is issued to stop charging. Results of this judgment are transmitted to the charging power supply CP via appropriate data communication. Further, this type of auxiliary charging circuit 73 can operate not only during charging but also during discharging to enable surge-current reduction and proper battery discharge to the load. This is implemented by turning OFF the discharge cut-off switch DSSW and turning ON a discharge cut-off FET 74DS in the auxiliary charging circuit 73 to reduce the discharge current through the resistor 75.

In the example of FIG. 2, three FETs are connected in series on the output line OL side of the protection unit 2. In this manner, by disposing the protection circuit, which protects battery cells during a malfunction, in the protection unit rather than in the battery packs, protection circuitry is unified allowing centralized control. This not only simplifies battery pack structure, but also has the advantage of unifying decision processes, which activate protection circuitry, in the protection unit outside the battery packs to avoid the risk of conflicting decisions. Specifically, this avoids conditions such as operating errors resulting from inconsistent decision results from a plurality of protection circuits, is simple from a control perspective, and achieves reliable battery protection with a high margin of safety. In particular, this system becomes more advantageous as the number of connected battery packs increases. Further, as the number of series-connected battery cells increases, requirements for high voltage-rated components such as semiconductor devices used in protection circuitry increases. In the present embodiment, since only one protection circuit needs to be provided in the protection unit instead of providing a protection circuit in each battery pack 20, the number of components requiring a high voltage-rating and having a high cost can be reduced. Accordingly, this system is also advantageous from a cost perspective.

Comparison Example

Figure 4:
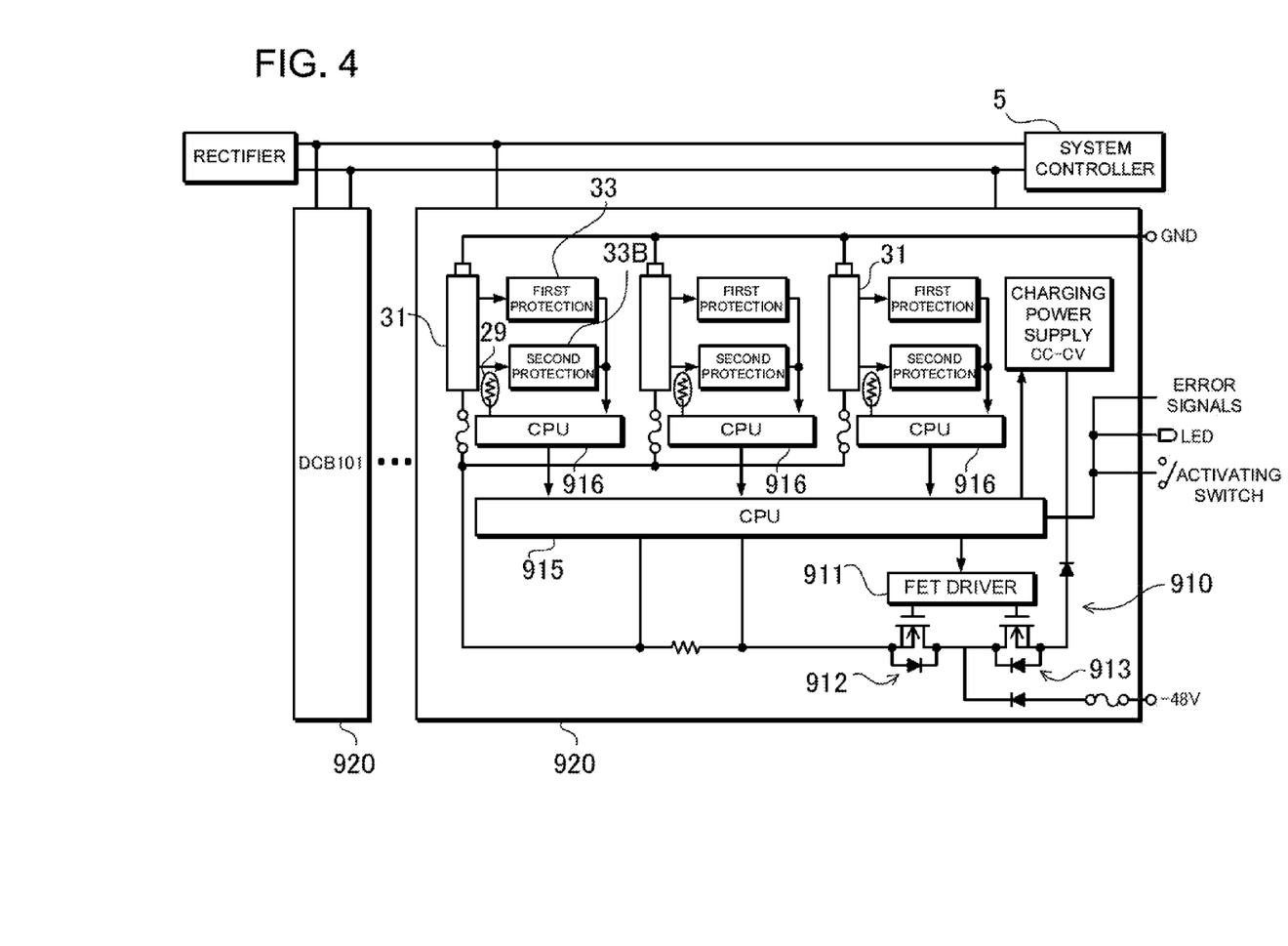
FIG. 4 is a block diagram showing battery packs in a comparison example.

To compare and contrast with the embodiments described above, FIG. 4 shows battery packs 920 in a comparison example. Each battery pack 920 shown in this figure is provided with a protection circuit 910 to protect each battery cell 31 from over-charging and over-discharging. More specifically, the protection circuit 910 is provided with a charging cut-off FET 913 and a discharge cut-off FET 912. ON and OFF control of these FETs 912, 913 is performed by a FET driver 911. Further, the FET driver 911 is controlled by a protection control circuit 915. The protection control circuit 915 controls the FETs 912, 913 ON and OFF to protect the battery cells 31 based on detection results from battery cell control circuits 916 established for each battery cell 31. A battery monitoring circuit 33 (corresponding to the battery monitoring circuit 33 in embodiments of the present invention) and a second battery monitoring circuit 33B (corresponding to the second battery monitoring circuit 33B in embodiments of the present invention) monitor individual parallel-connected battery cells 31 (or battery cells 31 connected in series and parallel as convenient). Each battery cell control circuit 916 collects detection results from its respective battery monitoring circuit 33 and second battery monitoring circuit 33B and sends that data to the protection control circuit 915. If an abnormality is detected in any of the battery cells, the protection control circuit 915 turns OFF the FETs 912, 913 to cut-off current and issues error signals to devices such as an external system controller 5. For battery packs 920 of this configuration, it is necessary to provide protection circuitry including FETs and FET activating circuitry in each battery pack making the circuit structure complex. In particular, from structural and cost perspectives, disadvantages increase as the number battery cells and battery packs increase. In contrast, in previously described power source apparatus for embodiments of the present invention, the protection circuit connects outside the battery packs and serves the use of common components. Further, in embodiments of the present invention, since error signal communication with each battery pack can use standards such as RS-485, control is unified and centralized, which is advantageous from the perspectives of reliability, and simplicity of management and control.

Figure 5:
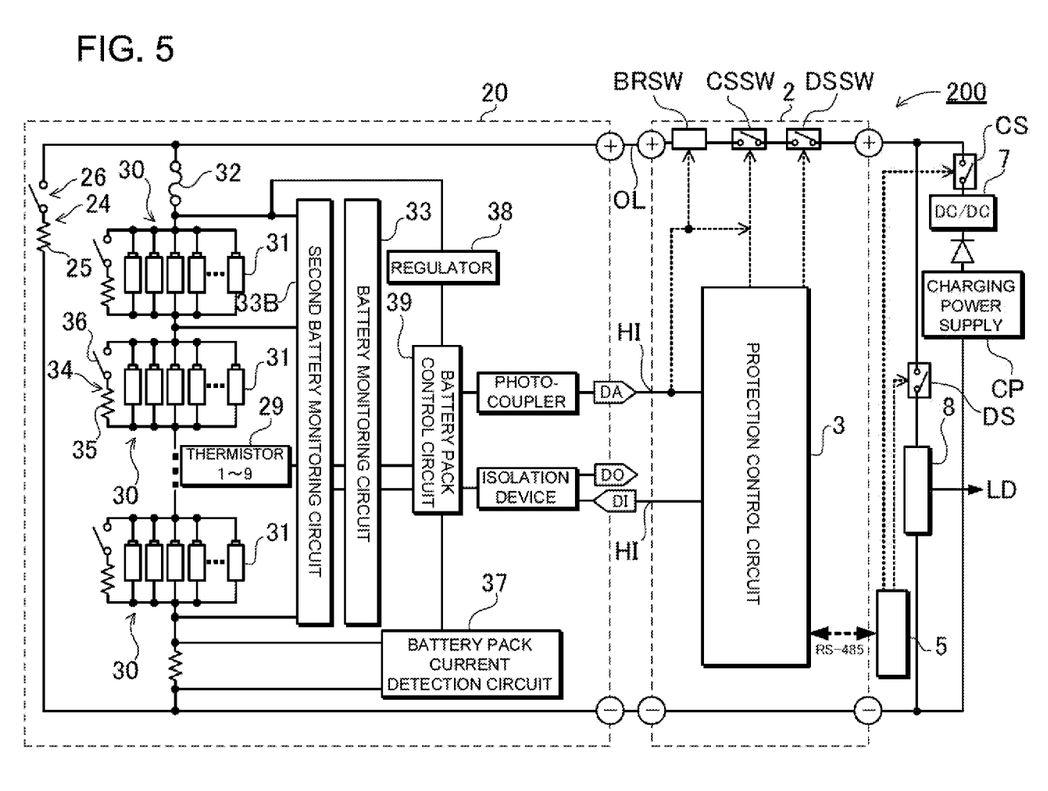
FIG. 5 is a block diagram showing an alternative example of a power source apparatus.

Although the discharge switch DS was disposed at the load LD and the charging switch CS was established inside the protection unit 2 in the example of FIG. 2, the power source apparatus is not limited to this structure. For example, the charging switch could be removed from the protection unit or charging and discharging switches could be disposed at the battery packs. As an example, FIG. 5 shows a power source apparatus 200 having not only an externally connected discharge switch DS, but also an externally connected charging switch CS. In this example, control of the charging switch CS and discharge switch DS is conducted by the system controller 5. This arrangement achieves the positive feature that protection unit structure and control can be simplified and charging and discharging can be supervised in a unified manner at the system controller. Alternatively, a charging switch could be installed at each battery pack 20. In that case, charging current is controlled by controlling the charging switch established at each battery pack 20. This has the positive feature that battery packs 20 can be simultaneously charged with different charging currents. Further, instead of, or in addition to the charging switch, a discharge switch can also be provided at each battery pack. Control of discharge current is particularly important for preventing over-discharging. Since high current greater than the charging current can flow during discharge, discharge switch operation is important to secure battery cell protection.

(Example of a Plurality of Connected Battery Packs 20)

Although the example of FIG. 2 describes only a single battery pack 20 connected to a protection unit 2, it is also possible to connect a plurality of battery packs in series or parallel. FIG. 6 shows an example of a power source apparatus 300 formed using a plurality of battery packs 20. In this figure, a plurality of battery packs 20 are connected in series to form battery units 10, and a plurality of battery units 10 are in-turn connected in parallel. In the example of FIG. 6, five battery packs 20 are connected in series to form a battery unit 10 (in the figure, each battery unit is shown as a column of three battery packs with two battery packs not shown), and two battery units 10 are connected in parallel to form a battery module 1. In this manner, by organizing battery packs, which are made up of a plurality of battery cells or battery blocks, into battery units, an arbitrary number of battery packs can be connected in series and/or parallel to yield voltage and current suited to the application.

As a result of this possibility to form large power source apparatus by connecting a plurality of battery packs, the number of battery packs can be adjusted to allow a straightforward solution even for large-scale applications. Further, even if an abnormal condition develops in any battery cell, only the battery pack housing the affected battery cell needs to be disconnected and replaced. This has the positive feature that battery replacement cost can be reduced.

(Battery Unit 10)

A battery unit 10 is made up of a plurality of connected battery packs 20. Each battery unit 10 is connected to an output line OL. In the example of FIG. 6, battery unit 10A and battery unit 10B are the same type of battery units 10. Further, although two battery units 10 are used in the figures, it should be clear that is also possible to connect three or more battery units.

In a battery unit 10 with a plurality of battery packs 20 connected together, one of the battery packs 20 functions as the parent battery pack with the other battery packs 20 serving as child battery packs controlled by the parent battery pack. The parent battery pack monitors the child battery packs and reports status to the protection control circuit 3. In the example of FIG. 6, the parent battery pack and child battery packs are configured as the same type of battery pack 20. Specifically, all the battery packs 20 are made with a common structure and since a battery pack 20 can function as a parent battery pack or a child battery pack depending on the connecting configuration, manufacturing cost can be reduced. In the example of FIG. 6, the battery pack 20 connected at the lower end of the battery unit 10 is used as the parent battery pack, and all the other battery packs 20 are used as child battery packs.

Each battery pack 20 in FIG. 6 is provided with signal terminals and power terminals. A battery pack input terminal DI, a battery pack error output terminal DA, and a battery pack output terminal DO are provided as signal terminals for the battery pack control circuit 39. The battery pack input terminal DI is a terminal for inputting signals from other battery packs and the protection control circuit 3. In contrast, the battery pack output terminal DO is a terminal for inputting and outputting signals to other (child) battery packs and the protection control circuit 3. The battery pack error output terminal DA is a terminal for outputting information conveying battery pack abnormality outside the battery pack. In the example of FIG. 6, battery pack error output terminals DA are connected to OR circuits 4. The battery pack input terminal DI and battery pack output terminal DO can also function (via data communication) as error output terminals in the same manner as the battery pack error output terminal DA.

Each battery pack 20 is also provided with a positive terminal and a negative terminal as output terminals for the battery cells 31 connected together in the battery pack 20. Positive terminals and negative terminals of adjacent battery packs 20 are connected to connect the battery packs 20 series and increase output voltage.

As mentioned, each battery unit 10 in FIG. 6 includes one parent battery pack and a plurality of child battery packs. The parent battery pack and child battery packs are connected in a string arrangement. To connect the signal terminals of adjacent battery packs 20 together, the output terminal DO of the previous battery pack 20 is connected to the input terminal DI of the next battery pack 20. The input terminal DI of the parent battery pack is connected with the output of the protection control circuit 3. Further, the output terminal DO of the last child battery pack is left unconnected. In this type of daisy-chain connection, it should be understood that the output terminal DO of the last child battery pack can also be connected to a terminator such as a termination resistor to indicate the position of the end of the signal line.

The battery pack input terminal DI and battery pack output terminal DO are two signal lines that conduct data communication with the protection control circuit 3. Data communication can be via a method such as packet communication that designates the destination of transmission. Here, each battery pack 20 has a pre-assigned unique identifier (address), and packets for packet communication include the address of the destination battery pack and commands issued to that battery pack. This allows data communication targeted to individual battery packs over a common signal line. Methods of assigning a unique address to each battery pack are applied as appropriate and include automatic allocation by the protection control circuit depending on the battery pack connecting scheme, and manual setting of switches such as dual inline package (DIP) switches in each battery pack.

With this type of connection, the parent battery pack can acquire battery data (such as battery voltage, temperature, and error data) from each child battery pack using a communication protocol (for example, a protocol that uses a master-slave relation) such as RS-485. Various data signals can be communicated from the parent battery pack to the protection control circuit 3 via a communication protocol such as RS-485.

In the example of FIG. 6, each battery unit 10 has one parent battery pack and four child battery packs connected for a total of five battery packs 20 in each battery unit 10 (two of the battery packs are not shown). Signal line connection between battery packs 20 is made with detachable connectors. This allows battery packs 20 to be easily connected and disconnected, which is advantageous during maintenance operations.

Each battery pack error output terminal DA is connected to an OR circuit 4. An OR circuit 4 is provided with each battery unit 10. Accordingly, in each battery unit 10, one parent battery pack and four child battery packs are connected to the OR circuit 4. If a stop-signal (error signal) is output to the OR circuit 4 from any one of the battery packs, current is cut-off in the manner described previously in the protection circuit section. Malfunctions include abnormal conditions such as over-charging and over-discharging. In addition, the protection control circuit 3 receives signals indicating the error condition and notifies the user urging replacement of the affected battery pack. Power source system recovery can be achieved by the user replacing only the affected battery pack. This system architecture can reduce repair cost by making it possible to replace only the affected battery pack, and since battery pack replacement is simplified by the use of detachable connectors, maintainability is improved.

Data such as battery voltage values converted by analog to digital (A/D) conversion are output from the battery monitoring circuit 33 to the battery pack control circuit 39. Based on battery voltage values, conditions such as over-charging and over-discharging are judged in the battery pack control circuit 39. In the event of an error condition such as over-charging or over-discharging, error data is transmitted from the child battery packs to the parent battery pack. In addition, values such as battery voltage for each battery pack are transmitted as data from the child battery packs to the parent battery pack.

In a battery unit 10, if an error condition occurs in a child battery pack or in the parent battery pack, the battery pack control circuit 39 of the parent battery pack communicates that to the protection control circuit 3. In that situation, the protection control circuit 3 turns a parallel connecting switch (not illustrated) OFF via the OR circuit 4. The battery pack control circuit 39 in the parent battery pack also acquires the battery voltages of the child battery packs and the parent battery pack, adds those voltages to obtain a total value, and transmits that total to the protection control circuit 3.

(Protection Control Circuit 3)

The protection control circuit 3 in the protection unit 2 is connected with, and controls each battery unit 10 and each OR circuit 4. The power source apparatus 300 shown in FIG. 6 has two battery units 10A, 10B connected in parallel, and is controlled by the protection control circuit 3 to drive the load LD and charge each battery unit 10 with the charging power supply CP. The protection control circuit 3 switches the appropriate switches ON and OFF for operation in the charging mode or discharging mode as described previously. Further, the protection control circuit 3 receives signals indicating abnormal conditions from each battery unit 10 via the input terminal DI of the parent battery pack 20. The protection control circuit 3 can be made up of a microcomputer or micro-processing unit (MPU).

In the example of FIG. 6, a power source apparatus with two battery units 10 is described. However, as mentioned previously, it should be clear that it is possible to connect three or more battery units together. Further, although all the battery units in this example are controlled by the protection control circuit 3 in a single protection unit 2, the power source apparatus can also be configured with a plurality of protection units 2 when there are a large number of battery units. Still further, although the protection control circuit in the example of FIG. 6 is established separate from the battery units, it could also be integrated into one of the battery units. In that case, protection control circuit functions could be integrated into the battery pack control circuit 39 of the parent battery pack 20.

In addition, the protection control circuit 3 is provided with a communication interface to communicate with externally connected equipment. In the example of FIG. 6, the protection control circuit 3 is connected to external devices such as the system controller 5 and communicates via known protocols such as universal asynchronous receiver transmitter (UART), RS-232C, or RS-485 protocols. Further, depending on requirements, a user interface can be provided to allow direct user control of the power source system. For example, an input device such as a keyboard, mouse, touch-panel, or console (terminal) can be connected as a user interface for the protection unit, and inputs can be made such as specifying the maximum current or setting the utilization of connected battery units. An indicator panel or warning lights can also be provided to alert the user when a battery pack 20 abnormality develops.

(OR Circuit 4)

The OR circuits 4 are connected with the protection control circuit 3 through a common bus line. The OR circuit 4 provided with each battery unit 10 is connected to the protection control circuit 3. The protection control circuit 3 notifies the user for battery pack 20 replacement when it receives an error signal from the battery pack control circuit 39 in the parent battery pack of a battery unit 10. For example, the protection control circuit 3 can urge battery pack replacement by sending that information from its communication interface to externally connected equipment. Or, the protection control circuit 3 can convey the need for battery pack replacement to the user by display on an indicator panel or by illumination of warning lights.

Note that system architecture is not limited to that of the example shown in FIG. 6. For example, it is also possible to transmit output from each battery pack error output terminal directly to the protection control circuit.

(Second Equalizing Circuit 24)

Turning to FIG. 2, each battery pack 20 is provided with a second equalizing circuit 24 configured as a second series circuit having a second limiting resistor 25 and a second equalizing switch 26. A second series circuit is connected in parallel with each battery pack 20. The second equalizing circuits 24 operate to eliminate non-uniformity (imbalance) among the battery packs 20. (Although not illustrated, first equalizing circuits are provided to eliminate imbalance between battery units.)

(Second Equalizing Circuit 24 Operation)

The second equalizing circuits 24 operate to equalize battery pack 20 voltages to eliminate imbalance. A battery pack 20 with high voltage is discharged through the second limiting resistor 25 of the second equalizing circuit 24. However, the present invention does not limit the equalizing circuits to circuitry that discharges batteries through current limiting resistors (passive cell balancing). For example, an equalizing circuit could discharge a high voltage battery into a charge storage device such as a capacitor or another battery, and transfer that accumulated charge by discharging the charge storage device to a low voltage battery to eliminate voltage differences between batteries (active cell balancing).

As mentioned, the second equalizing circuit 24 has the second limiting resistor 25 and second equalizing switch 26 connected in series as the second series circuit. The protection control circuit 3 or the battery pack control circuit 39 detects the voltages of each battery pack 20 and equalizes the battery packs 20 in a battery unit 10 by controlling the second equalizing switches 26 ON and OFF. A second series circuit having a second limiting resistor 25 and second equalizing switch 26 is connected in parallel with each battery pack 20. When the voltage of a battery pack 20 becomes high, the second equalizing switch 26 of the second equalizing circuit 24 is switched ON by the battery pack control circuit 39, and the battery pack 20 is discharged through the second limiting resistor 25 to reduce and equalize battery pack 20 voltage.

Battery pack control circuits 39, which are provided with microcomputers, compare battery pack 20 voltages and control the second equalizing switches 26 to equalize the voltages of all the battery packs 20. In a battery pack 20 with voltage greater that a set threshold voltage (battery pack threshold voltage), the battery pack control circuit 39 switches ON the second equalizing switch 26 in the second series circuit connected with that battery pack 20. As the battery pack 20 discharges, its voltage decreases. When battery pack voltage drops to a value equal to the voltage of the other battery packs, the second equalizing switch 26 is turned OFF. When the second equalizing switch 26 is turned OFF, battery pack discharge stops. In this manner, battery pack control circuits 39 discharge the high voltage battery packs to equalize the voltages of all the battery packs.

(Judging Cell/Battery Pack Balance)

A battery pack control circuit 39, which is provided with the capability to judge cell/battery pack balance, controls equalization of the voltages of the battery packs 20 connected in series in a battery unit 10 via the second equalizing circuits 24. As described above, the battery pack control circuit 39 in the battery pack 20 acting as the parent battery pack acquires the voltages of each battery pack 20 in the battery unit 10, compares those voltages, and maintains cell/battery pack balance by discharging battery packs 20 when necessary.

(Third Equalizing Circuit 34)

Each battery block 30 is provided with a third equalizing circuit 34 to eliminate non-uniformity (imbalance) among parallel blocks (as shown in FIG. 2). A third equalizing circuit 34 is connected in parallel with each battery block 30. Each third equalizing circuit 34 is configured as a third series circuit provided with a third limiting resistor 35 and a third equalizing switch 36 connected in parallel with each battery block 30. The third equalizing switches 36 are controlled ON and OFF by the battery pack control circuit 39.

(Third Equalizing Circuit 34 Operation)

Third equalizing circuits 34 eliminate voltage imbalance between battery blocks 30. The third equalizing circuits 34 in FIG. 2 discharge parallel blocks with high voltage through the third limiting resistors 35 to eliminate voltage imbalance. As mentioned, a third equalizing circuit 34 is provided with a third series circuit, which is the third limiting resistor 35 connected in series with the third equalizing switch 36. The battery pack control circuit 39 detects the voltage of each parallel block, and controls the third equalizing switches 36 ON and OFF to equalize the parallel blocks in a battery pack 20. Third series circuits (made up of third limiting resistors 35 and third equalizing switches 36) are connected in parallel with each battery block 30. When the voltage of any parallel block exceeds a set threshold voltage (battery block threshold voltage), the battery pack control circuit 39 switches ON the third equalizing switch 36 in the third series circuit connected with that parallel block. As a result, that battery block 30 discharges through the third limiting resistor 35 and the voltage of the battery block 30 decreases. When the voltage drops to a given battery block voltage, equalization of that parallel block is complete and the third equalizing switch 36 is turned OFF. The battery pack control circuit 39 compares the voltages of all the battery blocks 30, and controls the third equalizing switches 36 to equalize the voltages of all the battery blocks 30.

In this manner, power source apparatus 300 imbalance between battery units is eliminated by first equalizing circuits (not illustrated), imbalance between battery packs inside a battery unit is eliminated by second equalizing circuits 24, and imbalance between battery blocks 30 inside a battery pack is eliminated by third equalizing circuits 34. By performing equalization in this three-level hierarchical division, imbalance can be efficiently eliminated even in a power source apparatus employing many battery cells, and battery cells can be used in a stable manner over a long period to improve system reliability. Especially in a large-scale power source apparatus with high output power obtained using many battery cells, there is concern that if any battery cell becomes unusable, the entire power source apparatus will also become unusable. Therefore, it is particularly important for operation to enable each battery cell to be used under optimally stable conditions. Specifically, this can be addressed by operating under conditions that maintain cell balance and minimize (to the extent possible) imbalance between battery cells.

Although not illustrated in FIG. 6, it is also possible to connect surge current protection circuitry to the output-side of the power source apparatus.

The power source apparatus of the present invention can be used advantageously in applications such as a power source apparatus in the home or manufacturing facility that is charged by solar power or late-night (reduced-rate) power.

The invention claimed is:
1. A power source apparatus comprising:
   a plurality of battery packs, each of the battery packs having battery blocks connected in series, and each of the battery blocks including a plurality of rechargeable battery cells connected to each other; and
   a protection unit that can electrically connect with the battery packs,
   wherein the plurality of battery packs are connected to each other to form battery units, each of the battery units includes at least two of the plurality of battery packs, and each of the battery units is electrically and directly connected to the protection unit,
   wherein a first equalizing circuit is provided to eliminate voltage imbalance between the battery units,
   wherein each of the battery packs can be charged with power supplied from an external charging power supply, and power stored in each of the battery packs can be output externally, and
   wherein each of the battery packs comprises:
      a battery monitoring circuit for detecting a voltage of the rechargeable battery cells;
      a battery pack control circuit connected to the battery monitoring circuit; and a current fuse connected in series with the battery blocks to cut-off current flow when it exceeds a given value;

battery pack fault output terminals for sending battery pack error signals to other battery packs or to the protection unit when an abnormal condition develops; and a second equalizing circuit for eliminating voltage imbalance between the battery packs, wherein each of the battery blocks includes a third equalizing circuit for eliminating voltage imbalance between the battery blocks, wherein the protection unit is provided with protection unit input-output terminals to connect with the battery pack fault output terminals, and a protection circuit capable of cutting-off battery pack current, wherein if the battery monitoring circuit detects a voltage greater than or equal to a given battery cell threshold voltage in any of the rechargeable battery cells, a battery pack error signal is output from the battery pack fault output terminals of the affected battery pack to the protection unit input-output terminals of the protection unit, wherein when the protection unit detects the battery pack error signal, the protection circuit cuts-off current, and wherein an OR circuit is provided between the protection unit and each battery unit.

2. The power source apparatus as cited in claim 1, wherein the battery packs and the protection unit are connected via a common output line, and the protection circuit is connected in series with the output line.

3. The power source apparatus as cited in claim 1, wherein each battery pack further comprises a second battery monitoring circuit, wherein the power source apparatus is configured for the battery monitoring circuit to cut-off current at a first battery cell threshold voltage, and wherein the second battery monitoring circuit is configured to cut-off current, without intervention of the battery pack control circuit by outputting a battery pack error signal, at a second battery cell threshold voltage that is higher than the first battery cell threshold voltage.

4. The power source apparatus as cited in claim 1, wherein a plurality of the battery packs are connected in parallel, and the protection unit is connected in parallel with the battery packs.

5. The power source apparatus as cited in claim 1, wherein the protection circuit comprises:

a charging cut-off switch that cuts-off charging current; and a discharge cut-off switch that cuts-off discharge current.

6. The power source apparatus as cited in claim 1, wherein the protection unit further comprises battery charging functional capability to charge battery packs with power supplied from the external charging power supply.

7. The power source apparatus as cited in claim 1, wherein the battery packs do not have battery charging functional capability.

8. The power source apparatus as cited in claim 1, wherein the charging power supply is solar cell panels.

9. The power source apparatus as cited in claim 1, wherein data communication between battery packs is conducted according to RS-485 standards.

10. The power source apparatus as cited in claim 1, wherein, in each of the battery blocks, the plurality of the rechargeable battery cells are connected in parallel, and the battery monitoring circuit is connected in parallel with each of the battery blocks to detect the voltage of the rechargeable battery cells, and wherein the battery pack control circuit is configured to control battery block output current.

* * * * *